3,011,931
COMPOSITE RUBBER ARTICLE
Paul G. Carpenter, Baton Rouge, La., assignor to Phillips Petroleum Company, a corporation of Delaware
No Drawing. Filed Mar. 27, 1957, Ser. No. 648,766
3 Claims. (Cl. 154—52)

This invention relates to rubber articles composed of two or more rubbery components wherein rubber of different cure characteristics are used.

Many articles are made wherein it is desired to have different compositions in different parts of the article. One of the important fields in which such articles are made are rubber tires wherein the tread portion is of different composition than the carcass portion. Other composite articles include mats, tiles, rugs, floor and wall coverings of many types, table and counter tops, motor mounts, conveyor belts, pulleys, and the like. In rubber tires, it is desirable to use a tread composition which is highly resistant to abrasion resistance and one which has good oil resistance and flex life. Different requirements are involved in the carcass portion.

The use of such different rubbery compositions frequently results in a serious problem due to the fact that the rates of cure of the different components are different and this makes it difficult to obtain optimum properties in each of the portions of the composite article. The present invention relates to a modification of the slower curing material so that the difference in rates of cure is small enough that optimum properties can be obtained.

In recent years, polymers prepared with conjugated dienes and vinyl pyridines or vinylquinolines have become commercially available. The polymers prepared with these nitrogen-containing bases can be used to prepare rubbers having many outstanding properties such as excellent abrasion resistance, excellent oil resistance, and high flex life. Such properties are desirable, for example, for rubber used in the preparation of tires and other articles such as those enumerated above. However, one factor limiting the use of these polymers has been their rapid rate of cure (e.g. as measured by the scorch at 280° F.) as compared with other polymers. This has caused difficulty with the use of these polymers in the preparation of laminated structures. This invention provides a method for overcoming these difficulties. By practice of this invention, the nitrogen-containing polymers can be employed to full advantage more economically and more successfully than heretofore possible.

The following are objects of this invention.

An object of this invention is to provide composite rubber articles. A further object of this invention is to provide composite rubbery articles wherein substantially uniform rates of cure are obtained in each of the parts. A further object of this invention is to provide rubber tires having a tread portion of a fast curing rubber and a carcass portion of different composition but having substantially the same curing characteristics.

Other objects and advantages of my invention will become apparent to one skilled in the art upon reading the accompanying disclosure.

My invention is based upon the discovery that a small amount of the polymer containing the polymerizable heterocyclic nitrogen base, when incorporated with a rubber of the butadiene/styrene, nitrile, or acrylate types will increase the rate of cure so that it is substantially the same as that of the polymer of the heterocyclic nitrogen base.

One satisfactory method for determining this rate of cure is to use the Mooney test machine. In this machine, the portion of the rubber is run until the minimum Mooney is obtained and the time noted. The test is continued until the Mooney increases 5 points and the time for this 5 point rise recorded in minutes. This gives a good measure of the rate of cure of the material. When a composite article is cured, best results are obtained if the time for this 5 point Mooney rise is the same. However, satisfactory test results can be obtained when the difference in rate of cure is as high as 6 minutes although it is preferably 3 minutes or less.

The rubbery, nitrogen-containing polymers covered by the scope of this invention are those prepared by polymerization of a major portion of a conjugated diene containing not over 6 carbon atoms such as 1,3-butadiene, isoprene, piperylene, methyl pentadiene, and 2,3-dimethyl-1,3-butadiene, with a minor portion of a copolymerizable heterocyclic nitrogen base. These copolymerizable heterocyclic nitrogen bases are those of the pyridine and quinoline (including isoquinoline) series which contain a

wherein R is hydrogen or methyl. Representative heterocyclic nitrogen compounds useful in the practice of this invention include: 2-vinylpyridine; 4-vinylpyridine; 2-methyl - 5 - vinylpyridine; 2,6-diethyl-4-vinylpyridine; 3-ethyl-5-vinylpyridine; 5-ethyl-2-vinylpyridine; 4-methyl-3-vinylpyridine; 2,3,4-trimethyl-5-vinylpyridine; 3,4,5,6-tetramethyl-2-vinylpyridine; 2 - methyl-5-undecyl-6-vinylpyridine; 2-isopropenyl-pyridine; 5-propyl-2-isopropenyl-pyridine; 2-octyl-5-vinylpyridine; 2-vinylquinoline; 8-ethyl-2-vinylquinoline; 4-hexyl-5-vinylquinoline; 1-vinyl-isoquinoline; 5-methyl-1-isopropenylisoquinoline; and the like. In the alkyl substituted derivatives, I prefer to use those wherein the total number of carbon atoms in the alkyl groups is not over 12.

The base rubbers to which these nitrogen-containing polymers are added are those prepared by polymerizing a major amount of a conjugated diene containing not over 6 carbon atoms and a minor amount of styrene, α-methyl styrene; vinyl toluene, arcylonitrile, methacrylonitrile, ethacrylonitrile, methyl acrylate or ethyl acrylate. Such rubbery products are generally known as the butadiene/styrene type, the nitrile type, and the acrylate type. While the rubber of each of the components can be prepared using a major amount of the conjugated diene and a minor amount of the comonomer, preferred products are those prepared by polymerizing, based upon 100 parts by weight of monomers, 70 to 90 parts of the diene and 30 to 10 parts of the comonomer. Polymerization processes for rubbers of the butadiene/styrene type are well known. Copolymers prepared from the conjugated diene and the heterocyclic nitrogen base can be prepared by similar processes, and specific examples of their production are described by Pritchard and Opheim, Ind. Eng. Chem., 46, No. 10, 2242 (1954).

For the practice of this invention, the conventional polymer or polymers of the preceding paragraph are used in admixture with the heterocyclic nitrogen base containing polymers. While small amounts of the nitrogen-containing polymers can produce beneficial effects, amounts of 10 percent or more based on the weight of the base rubber are generally preferred. Up to 50 weight percent can be used although the incremental improvement over 25 weight percent is very slight. The mixture of the two polymers can be compounded in the usual manner to produce stocks having the desired properties. These stocks can be sheeted, extruded or molded prior to curing.

The rubber layer in contact with the layer comprising the homogeneous mixture of two or more polymers described above can comprise one or more of the polymers of the nitrogen base monomers as previously described. Such mixtures can also be compounded as desired to yield a rubber stock which can be placed adjacent layers formulated with conventional rubbers.

The invention is further illustrated by the results of runs set forth in the following example.

products were determined, these results being tabulated in the following table. Runs 1–7 were made using NOBS Special in the butadiene/styrene copolymer and runs 8–11 using Santocure.

| Run No. | Butadiene/ 2-methyl-5-vinyl-pyridine Copolymer, Parts by weight | Butadiene/ Styrene Copolymer, parts by weight | Compression Set, percent | 80° F. 300% Modulus, p.s.i. | 80° F. Tensile, p.s.i. | 80° F. Elongation, percent | 200° F. Maximum Tensile, p.s.i. | Abrasion Loss, g. | 212° F. Compounded MS 1½ | Scorch @ 280° F. Minimum Mooney | Scorch @ 280° F. 5 Point Rise, min. | Extrusion at 250° F. in./min. | Extrusion at 250° F. g./min. |
|---|---|---|---|---|---|---|---|---|---|---|---|---|---|
| 1 | 100 | 0 | 17.6 | 1,625 | 3,230 | 500 | 1,350 | 3.00 | 26.5 | 29.5 | 16 | 32 | 72 |
| 2 | 90 | 10 | 15.2 | 1,760 | 3,310 | 500 | 1,540 | 3.22 | 28 | 31.5 | 15 | 30 | 71 |
| 3 | 75 | 25 | 14.6 | 1,730 | 3,310 | 510 | 1,460 | 4.26 | 30 | 32.5 | 15 | 30.5 | 73 |
| 4 | 50 | 50 | 13.1 | 1,890 | 3,300 | 500 | 1,460 | 6.01 | 34 | 35.5 | 15 | 31 | 74 |
| 5 | 25 | 75 | 12.8 | 1,810 | 3,300 | 510 | 1,500 | 6.52 | 35 | 37 | 16.5 | 32.5 | 77.5 |
| 6 | 10 | 90 | 13.0 | 1,790 | 3,400 | 515 | 1,640 | 6.46 | 36 | 36.5 | 22.5 | 34.5 | 80.5 |
| 7 | 0 | 100 | 23.8 | 1,270 | 3,420 | 625 | 1,820 | 9.08 | 33.5 | 33.5 | 33.5 | 37.5 | 85.5 |
| 8 | 90 | 10 | 15.8 | 1,610 | 3,210 | 500 | 1,690 | 3.21 | 28 | 30.5 | 17.5 | 33.5 | 76.5 |
| 9 | 75 | 25 | 14.6 | 1,660 | 3,140 | 500 | 1,490 | 4.48 | 28 | 32.5 | 16 | 32.5 | 75.5 |
| 10 | 50 | 50 | 13.6 | 1,750 | 3,070 | 480 | 1,400 | 6.50 | 33 | 35 | 14.5 | 31.5 | 76 |
| 11 | 25 | 75 | 12.8 | 1,660 | 3,160 | 505 | 1,600 | 7.12 | 37 | 36.5 | 15.5 | 33.5 | 78.5 |
| 12 | 10 | 90 | 13.5 | 1,680 | 3,300 | 520 | 1,710 | 7.15 | 38 | 36.5 | 18.5 | 34.5 | 80.5 |
| 13 | 0 | 100 | 19.8 | 1,360 | 3,350 | 595 | 1,600 | 9.48 | 34 | 34 | 24 | 37 | 85 |

EXAMPLE

A polymer of 1,3-butadiene and 2-methyl-5-vinylpyridine was prepared at 41° F. using the following recipe.

| | Parts by weight |
|---|---|
| Water | 200 |
| Butadiene | 75 |
| 2-methyl-5-vinylpyridine | 25 |
| Potassium fatty acid soap | 6 |
| KOH | 0.1 |
| KCl | 0.3 |
| Daxad 11[1] | 0.3 |
| Sodium formaldehyde sulfoxylate | 0.1 |
| $FeSO_4 \cdot 7H_2O$ | 0.02 |
| Ethylenediamine tetraacetic acid | 0.04 |
| Cumene hydroperoxide | 0.1 |
| Tert-dodecyl mercaptan | 0.44 |

[1] Sodium salt of condensed alkyl aryl sulfonic acid.

After 22 hours, the reaction was stopped and 2 parts of phenyl-beta-naphthylamine based on the polymer was added as an antioxidant.

A butadiene/styrene copolymer was prepared by emulsion polymerization at 45° F. using a monomer weight ratio 75 parts of butadiene and 25 parts of styrene. This was the commercial product marketed by Phillips Petroleum Company as Philprene 1500. The polymers were compounded using the following recipes.

| | Parts by weight | | |
|---|---|---|---|
| Butadiene/2-methyl-5-vinylpyridine | 100 | | |
| Butadiene/styrene copolymer | | 100 | 100 |
| Philblack O | 50 | 50 | 50 |
| Zinc oxide | 3 | 3 | 3 |
| Stearic acid | 1 | 1 | 1 |
| Flexamine [1] | 1 | 1 | 1 |
| Circo-Para [2] | 10 | 10 | 10 |
| Sulfur | 1 | 1.75 | 1.75 |
| Sulfasan R [3] | 1.5 | | |
| NOBS Special [4] | 0.75 | 1.1 | |
| Santocure [5] | | | 1.1 |

[1] Physical mixture containing 65% diarylamine-ketone reaction product and 35% N,N'-diphenyl-p-phenylenediamine.
[2] A 50:50 blend of Circosol-2XH and Para Flux 2016. Circosol-2XH is a petroleum hydrocarbon softener, containing hydrocarbons of high molecular weight, in the form of a heavy, viscous, transparent, pale green, odorless liquid of low volitility; sp. gr. 0.940; Saybolt Universal viscosity at 100° F. about 200 seconds. Para Flux 2016 is a saturated polymerized hydrocarbon.
[3] 4,4'-diethiodimorpholine.
[4] N-oxydiethylene-2-benzothiazolesulfenamide.
[5] N-cyclohexyl-2-benzothiazolesulfenamide.

To show the effect of the polymer containing the 2-methyl-5-vinylpyridine, various amounts thereof were mixed with the butadiene-styrene copolymer. In each case, the stock was mixed individually and then the blends were made with the ratio of the blend based upon the rubber and not on the compound weight. Following curing for 30 minutes at 307° F., the physical properties of these The column which best illustrates the advantages of my invention is that showing the time for the 5 point rise in Mooney.

The following important factors should be noted from the data reported in the preceding table. Comparison of runs 1 and 7 or 13 show that the scorch resistance, as indicated by the 5 point rise, differ widely for the butadiene/2-methyl-5-vinylpyridine copolymer and the butadiene/styrene copolymer. However, when the butadiene/2-methyl-5-vinylpyridine content in the blend becomes about 25 percent or more by weight of the product, the scorch resistance becomes essentially independent of the amount of 2-methyl-5-vinylpyridine rubber. Other advantages also result from increase in the amount of 2-methyl-5-vinylpyridine rubber used with the butadiene/styrene copolymer. The compression set data show than a better, tighter cure is obtained, and the modulus is improved.

It should be noted the abrasion resistance of the 2-methyl-5-vinylpyridine stocks (run 1) is superior to those of the butadiene/styrene stocks (runs 7 and run 13). This advantage can be utilized in the preparation of laminates and particularly of tires or other items where a wear-resistant surface is desired.

A tire can be made utilizing the teachings of this invention in the following manner. Using the cap and base construction, the disclosed nitrogen-containing rubbers are used to form the wearing cap while blends of those rubbers with butadiene/styrene, nitrile, or acrylate types are used to form the side-walls or other components. In this manner, equal curing rates of the compounds can be obtained. Furthermore, scrap from the fabricating operations can be remixed, if desired, with no processing difficulty.

As many possible embodiments can be made from this invention without departing from the scope thereof, it is to be understod that all matter herein set forth is to be interpreted as illustrative and not as unduly limiting the invention.

I claim:
1. A rubber tire comprising a tread comprising sulfur and a copolymer prepared by polymerizing a mixture of monomers consisting of a major proportion of 1,3-butadiene and a minor proportion of 2-methyl-5-vinylpyridine and a carcass comprising a mixture of sulfur, a copolymer prepared by polymerizing a mixture of monomers consisting of a major proportion of 1,3-butadiene and a minor proportion of styrene and a copolymer prepared by polymerizing a mixture of monomers consisting of a major proportion of 1,3-butadiene and a minor proportion of 2-methyl-5-vinylpyridine, the amount of said second copolymer in said mixture being 25 to 50 weight percent of said mixture, the tread and carcass of said tire having approximately the same curing properties.

2. A rubber tire comprising a tread comprising sulfur and a copolymer prepared by polymerizing a mixture of monomers consisting of, based upon 100 parts by weight of monomers, 70 to 90 parts of 1,3-butadiene and 30 to 10 parts of 2-methyl-5-vinylpyridine and a carcass comprising a mixture of sulfur, a copolymer prepared by polymerizing a mixture of monomers consisting of 70 to 90 parts of 1,3-butadiene and 30 to 10 parts of styrene and a copolymer prepared by polymerizing a mixture of monomers consisting of 70 to 90 parts of 1,3-butadiene and 30 to 10 parts of 2-methyl-5-vinylpyridine, the amount of said second polymer in said mixture being 25 to 50 weight percent of said mixture, said tread and carcass having approximately the same curing properties.

3. A rubber tire comprising a tread comprising sulfur and a copolymer prepared by polymerizing a mixture of monomers consisting of a major portion of a conjugated diene containing not over 6 carbon atoms and a minor proportion of a copolymerizable

substituted heterocyclic base of the pyridine and quinoline series where R is selected from the group consisting of hydrogen and methyl and a carcass comprising a mixture of sulfur, a copolymer prepared by polymerizing a mixture of monomers consisting of a major proportion of a conjugated diene containing not over 6 carbon atoms and a minor proportion of a monomer selected from the group consisting of styrene, alphamethylstyrene, vinyltoluene, acrylonitrile, methacrylonitrile, ethacrylonitrile, methyl acrylate and ethyl acrylate and a copolymer prepared by polymerizing a mixture of monomers consisting of a major proportion of a conjugated diene containing not over 6 carbon atoms and a minor proportion of a copolymerizable

substituted heterocyclic base of the pyridine and quinoline series where R is selected from the group consisting of hydrogen and methyl, the amount of said second copolymer in said mixture being 25 to 50 weight percent of said mixture, said tire having tread and carcass of approximately the same curing properties.

| | | |
|---|---|---|
| 2,188,283 | Manchester | Jan. 23, 1940 |
| 2,583,387 | Morrissey et al. | Jan. 22, 1952 |
| 2,615,826 | Mallory | Oct. 28, 1952 |
| 2,676,636 | Sarbach | Apr. 27, 1954 |
| 2,681,331 | Howland et al. | June 15, 1954 |
| 2,742,942 | Owen | Apr. 24, 1956 |
| 2,817,616 | Wolfe | Dec. 24, 1957 |
| 2,844,502 | Paxton | July 22, 1958 |

OTHER REFERENCES

Substituted Vinylpyridines as Monomers for Synthetic Elastomers, by Robert L. Frank et al., an article in Industrial and Engineering Chemistry, vol. 40, No. 5, May 1948, pages 879–882.

Synthetic Rubber, by G. S. Whitby, published by John Wiley & Sons, Inc. N.Y. Copyright 1954, pages 724–726.

Industrial and Engr. Chem., vol. 40, No. 8. Article by Rinnie et al., (pages 1437–1440), August 1948.